Patented Apr. 19, 1932

1,854,258

UNITED STATES PATENT OFFICE

PAUL HEROLD AND PAUL KOPPE, OF NEUROSSEN, GERMANY, ASSIGNORS TO GENERAL ANILINE WORKS, INC., OF NEW YORK, N. Y., A CORPORATION OF DELAWARE

PRODUCTION OF AROMATIC AMINES

No Drawing. Application filed September 21, 1927, Serial No. 221,132, and in Germany September 22, 1926.

This invention relates to the reduction of aromatic nitro compounds to the corresponding amines by means of hydrogen in the presence of a catalyst.

Aromatic amines can be produced from the corresponding nitro compounds by catalytic reduction in the liquid phase in the presence of platinum metals or nickel at ordinary or elevated pressure. In this process, both the hydrogen and the nitro compounds must be purified from catalyst poisons to a considerable extent, and moreover the yields obtained in this manner are often unsatisfactory, since when pure nitro compounds and pure reducing agents are employed, the reaction does not stop at the reduction of the aromatic nitro compound to the corresponding amine, but continues further with nuclear hydrogenation and separation of ammonia and other results.

We have now found that the production of aromatic amines may be carried out with far greater advantage by reducing the corresponding impure industrial nitro compounds, especially such as are contaminated with compounds of sulfur, in the liquid phase by means of hydrogen or carbon monoxid or mixtures of hydrogen and carbon monoxid or gas mixtures containing the same at elevated temperature and under pressures of at least 20 atmospheres in presence of a hydrogenating cataylst which expression is meant to comprise such catalysts as have been found to promote the conversion of nitro-compounds to amines. Also the reduction gases may be employed in the impure state, and may in particular be contaminated with compounds of sulfur. Suitable catalysts, according to the present invention, comprise the metals of the groups 2 to 8 of periodic system, especially the heavy metals of these groups, and also copper, silver and gold, and compounds of these metals, either alone or on carriers. The improvement in the reduction process is due to the fact that the action of the catalyst is moderated by the impurities, and thus the reaction does not proceed further than to the formation of the amines.

Therefore according to this invention, if the aromatic nitro compound to be reduced is already pure, the reaction must be retarded by adding sulfur or compounds of sulfur in order to weaken the action of the catalyst. This may be also effected by employing the reducing gases above specified in an impure state, especially by working with gases containing sulfur or sulfur compounds, if desired with a further addition of sulfuretted hydrogen, or also ammonia and steam. Again, both the initial materials may also be pre-treated in the manner herein specified.

Under these conditions, the reaction is restricted to the formation of amino-compounds. It begins at about 100° C. and may be substantially accelerated by ensuring intimate contact between gas, liquid and the contact mass as for example by sprinkling the contact mass with the liquid nitro-compound in an atmosphere of hydrogen.

The following examples will further illustrate the nature of the said invention which however is not limited thereto. The parts are by weight where not otherwise specified.

Example 1

300 parts of crude industrial nitrobenzene are stirred with 100 parts of Swedish spongy iron for 6 hours in an iron autoclave, at a temperature of 180° C. and under a pressure of 140 atmospheres of hydrogen. At the end of that time the reduction is complete. 220 parts of aniline, free from nitrobenzene, are obtained.

Example 2

1 per cent of sulfur is dissolved in nitrobenzene, and the mixture is heated to 150° C. in the presence of 1 per cent of its weight of iron powder, for 5 hours under a pressure of 150 atmospheres of hydrogen, a good yield of almost pure aniline being obtained.

Example 3

Nitrobenzene is allowed to trickle down in an atmosphere of hydrogen which has a pressure of 200 atmospheres and contains small quantities of ammonia, sulfuretted hydrogen and steam at 200° C. over nickel deposited on an artificial zeolite, contained in an aluminium-lined high pressure vessel, the said catalyst having been reduced with hydrogen at 350° C. and at ordinary pressure, the supply of nitrobenzene being regulated to the rate of one third the volume of the contact mass per hour. Apart from water, the resulting product consists almost entirely of aniline.

What we claim is:

1. The process of producing aromatic amines which consists in reducing the corresponding nitro compounds in the liquid phase with a gas comprising at least one of the reducing agents selected from the group consisting of hydrogen and carbon monoxid, in the presence of a hydrogenation catalyst, at temperatures of at least 100° C. and under a pressure of at least 20 atmospheres in the presence of a substance selected from the group consisting of sulfur and sulfides.

2. The process of producing aromatic amines, which comprises reducing the corresponding impure nitro compounds in the liquid phase with an impure industrial gas comprising at least one of the reducing agents selected from the group consisting of hydrogen and carbon modoxid, in the presence of a hydrogenation catalyst, at temperatures of at least 100° C. and under a pressure of at least 20 atmospheres, at least one of the reacting components containing a substance selected from the group consisting of sulfur and sulfides.

3. The process of producing aniline, which comprises reducing crude nitrobenzene containing a substance selected from the group consisting of sulfur and sulfides in the liquid phase with a gas comprising at least one of the reducing agents selected from the group consisting of hydrogen and carbon monoxid, in the presence of a hydrogenation catalyst, at temperatures of at least 100° C. and under a pressure of at least 20 atmospheres.

In testimony whereof we have hereunto set our hands.

PAUL HEROLD.
PAUL KOPPE.